United States Patent
Sato

[19]

[11] Patent Number: 5,995,240
[45] Date of Patent: *Nov. 30, 1999

[54] FACSIMILE SERVER APPARATUS AND METHOD CONFIGURED TO AUTOMATICALLY TRANSMIT CLIENT ADDRESS INFORMATION TO FACSIMILE TERMINALS

[75] Inventor: Masaki Sato, Kawasaki, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,833

[22] Filed: Dec. 27, 1996

[30] Foreign Application Priority Data

Dec. 28, 1995 [JP] Japan ................................. 7-342094

[51] Int. Cl.$^6$ ........................................................ H04N 1/32
[52] U.S. Cl. ......................... 358/407; 358/404; 358/440
[58] Field of Search .................................. 358/403–407, 358/434–436, 438–440; 379/93.24, 100.09, 100.14; 395/200.01, 200.03; H04N 1/32

[56] References Cited

U.S. PATENT DOCUMENTS 5,408,610  4/1995  Arakwa ............................... 395/200.01
5,585,854 12/1996  Makino .................................... 358/407
5,594,867  1/1997  Yoshida .................................... 358/407
5,655,079  8/1997  Hirasawa et al. .................. 395/200.01
5,838,459 11/1998  Hashimoto .............................. 358/440

FOREIGN PATENT DOCUMENTS 5-276197  10/1993  Japan .
7-38604   2/1995   Japan .

Primary Examiner—Kim Yen Vu
Attorney, Agent, or Firm—Oblon, Spivak, McClelland, Maier & Neustadt, P.C.

[57] ABSTRACT

A method and apparatus including a facsimile server for a local area network (LAN) configured to automatically transmit information including client addresses to facsimile terminals on public telephone networks. The facsimile server includes a memory configured to store an address list, entries in which contain a calling number, a local number, and a user name, each specifying a same information processing apparatus (e.g., client) on the LAN. The facsimile server is configured to respond to a request for sending the address list. When a source facsimile terminal sends image information to a client of the facsimile server without specifying a calling number for the client, the facsimile server detects that the calling number is missed and automatically sends the address list back to the facsimile terminal so that the facsimile terminal can properly retransmit the image information for a second time while identifying the client in the second transmission.

85 Claims, 9 Drawing Sheets

ADDRESS LIST
OF PCs ON OUR NETWORK

— OUR FACSIMILE SERVER NO. 3324-123400 —

| LOCAL ADDRESS IN OUR NETWORK | USER NAMES | PUBLIC ADDRESS FOR CALLING FROM OUTSIDE |
|---|---|---|
| 001 | M. SATO | 3324-123456 |
| 002 | S. MITA | 3324-123654 |
| 003 | T. SUZUKI | 3324-123987 |
| 004 | Y. YAMADA | 3324-123852 |

*FIG. 3*

FACSIMILE SERVER APPARATUS AND METHOD CONFIGURED TO AUTOMATICALLY TRANSMIT CLIENT ADDRESS INFORMATION TO FACSIMILE TERMINALS

BACKGROUND OF THE INVENTION

1. Field of the Invention

The present invention relates to a facsimile server and method performed thereby, and more particularly to a facsimile server which is capable of automatically transmitting client address information to facsimile terminals.

2. Discussion of the Background

Recently, facsimile servers have been used to connect a local area network (LAN) to public telephone networks (e.g., public switched telephone network, PSTN, or the like). Generally, LANs interconnect a number of client information processing terminals, such as, for example, a personal computer (such as a Bravo 66/2 manufactured by AST corporation), a workstation (e.g., SPARC 20 manufactured by SUN Microsystems), and so forth. Also, each of such public telephone networks, such as, the PSTN, the integrated services digital network(ISDN), cellular networks (e.g., AMPS, and the like) and so forth, has a linkup of a larger number of facsimile terminals among other communication terminals such as a telephone, multifunction printer/scanner/fax/copier (such as Canon's Model 2500 multiscan) and so forth.

A main function of the facsimile server in a LAN is likely a gateway. More specifically, the facsimile server carries out sequential operations of temporarily receiving image information (e.g., a message) sent to "clients" (i.e., nodes on the LAN) from other facsimile terminals via the PSTN, and distributing the received image information to designated clients. In addition, the facsimile server provides a bi-directional function by relaying image information in the reverse direction (i.e., from clients to other facsimile terminals).

Conventionally, there have been introduced various ways for specifying clients on the LAN for the above-mentioned function of the facsimile server. An example is disclosed in the official gazette for Laid Japanese Patent Application TOKUKAI HEI 5-276197. This example uses a direct dial-in service, provided by the telephone network provider, for example, NIPPON TELEGRAM AND TELEPHONE CORPORATION (NTT), for specifying one client among other candidate clients on the LAN. Under this direct dial-in service, a telephone number is previously established to each candidate client on the LAN. A facsimile terminal uses the public telephone line resources to transmit image information using those telephone numbers to a facsimile server. In response, the image information is then transmitted through the facsimile server to a recipient client via the specified by the telephone number.

Another example as disclosed in Japanese Official Gazette for Laid Japanese Patent Applications, identified as TOKUKAI HEI 7-38604, utilizes a sub-address system defined by the ISDN standard to specify a client among information processing terminals on a LAN.

Another example teaches a use of a transmitting subscriber identification (TSI) field in a protocol defined by a Group 3 facsimile standard defined by CCITT (the Commute Consultant International de Telegraph and Telephonie) to specify a client among information processing terminals on a local area network.

Another example teaches a use of a dual tone multiple frequency(DTMF) to specify a client from among information processing terminals on a LAN.

Yet another example teaches a use of a confidential identifier under the protocol of any communication standard other than CCITT Group 3 facsimile standard to specify a client from among other terminals on a LAN.

Each of the above-mentioned facsimile servers are provided with a function for distributing facsimile image information sent from a facsimile terminal to a recipient information processing terminal.

However, a limitation with the above approaches, as identified by the Applicant, is when a source facsimile terminal transmits image information to a client from multiple terminals on a LAN, the source facsimile terminal must previously know (i.e., have apriori knowledge) of an identification of the intended destination information processing terminal, such as, for example, a telephone number under the direct dialing-in service, a sub-address of ISDN, and so forth, as described hereinbefore. When the source facsimile terminal does not have such identification, an operator usually needs to get in contact with a user at the recipient side to request to send an appropriate identification number. In this event, the operator of the source facsimile terminal must wait to receive such information for a relatively long time, which results in wasted time for operators at both the sending and receiving sites.

SUMMARY OF THE INVENTION

Accordingly, an object of the present invention is to provide a novel facsimile server and method that automatically transmits client address information to other facsimile terminals when such other facsimile terminals request the information.

Another object of the present invention is to provide a novel facsimile server and method that automatically transmits client address information to other facsimile terminals when the other facsimile terminals send image information to an information processing apparatus on a LAN to which the facsimile server is coupled, without specifying an address for the information processing apparatus.

To achieve these and other objects, a novel method and apparatus interconnect a facsimile server in a LAN with other information processing apparatuses and public telephone networks that connect a source facsimile terminal. According to the present invention, a memory unit in the facsimile server stores an address list including a public address by which an information processing apparatus on the LAN is called from facsimile terminals on the public telephone networks and a corresponding local address locally used within the LAN, the public address and the corresponding local address in each corresponding to a same one of the information processing apparatuses. An operation interface unit is employed for entering data and displaying stored data, while a registration control unit is employed for controlling registration and a change of a public address and a corresponding local address, in combination, in the address list stored in the memory unit through the operation interface unit. An address list request detector is used for detecting a request message which requests sending the address list under a polling mode of operation as defined by the CCITT (the Comite Consultantif Internationale de Telegraph and Telephonie). The request message is sent from a facsimile terminal on the public telephone networks.

The novel method and apparatus employs a telephone number detector for detecting a telephone number of the source facsimile terminal when the facsimile server receives a request message. When the facsimile server receives image information, a public address detector detects a public address of an information processing apparatus on the LAN to which image information is ultimately to be sent.

The novel method and apparatus employs an information distributor for transmitting image information sent from a source facsimile terminal via the public telephone network to an information processing apparatus addressed with a public address by the source facsimile terminal and for receiving data from an information processing apparatus on the LAN. A polling transmission manager transmits the address list during the polling operation mode to the source facsimile terminal, and a transmission controller instructs the polling transmission manager to transmit the address list to the source facsimile terminal in accordance with the public address detected by the telephone number detector only when the address list request detector detects request message. In this way, the novel facsimile server transmits the address list to the source facsimile terminal which has sent the request message.

The facsimile transmission manager of the present invention is configured to transmit the address list during the ordinary facsimile operation mode to the source facsimile terminal on the public telephone network, wherein the transmission controller instructs the facsimile transmission manager to transmit the address list to the source facsimile terminal in accordance with the public address detected by the telephone number detector only when the public address detector fails to detect a public address of an information processing apparatus to which the source facsimile terminal sends image information. In this way, the novel method and facsimile server transmits the address list to the source facsimile terminal which has sent image information to an information processing apparatus on the LAN, without having specifying an address for the information processing apparatus.

The method and apparatus according to the present invention, configures the memory unit to store an address list of facsimile terminals on the public telephone networks made on the basis of mutual agreement. Furthermore a verification manager is included for verifying a public address of the source facsimile terminal detected by the telephone number detector with the address list previously stored in the memory unit. In addition, the transmission controller of the facsimile server instructs the facsimile transmission to transmit the address list to the source facsimile terminal in accordance with the public address detected by the telephone number detector only when the public address detector fails to detect a public address of an information processing apparatus to which the source facsimile terminal sends image information and when the public address detected by the telephone number detector is verified with the address list previously stored in the memory unit. In this way, the novel facsimile server improves information security by verifying authorization before sending client addresses to other facsimile terminals.

As a feature of the facsimile server according to the present invention, the address list previously stored in the memory unit is a list of specific identification numbers made on the basis of mutual agreement.

As another feature of the facsimile server according to the present invention, one of the public telephone networks is a PSTN, another one is an ISDN, and a third one is a radio frequency (RF) based wireless network, such as a cellular network.

As a feature of the facsimile server according to the present invention, the public address is a sub-address defined by the ISDN.

As a feature of the facsimile server according to the present invention, the public address is a direct dialing number.

As a feature of the facsimile server according to the present invention, the public address is formed by characters embedded in the TSI field defined by the CCITT Group 3 facsimile procedure.

As a feature of the facsimile server according to the present invention, the address list includes a user name of an information processing apparatus on the LAN, in combination with the public address and the corresponding local address so as to specify the respective information processing apparatuses.

As a feature of the facsimile server according to the present invention, the registration manager is capable of controlling registration and a change by transmitting data from the information processing apparatuses on the LANs through the information distributor.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is an illustration showing an exemplary address list of a telephone number, a corresponding local number, and a user name, each specifying a same information processing apparatus on the LAN;

DESCRIPTION OF THE PREFERRED EMBODIMENTS

Figure 1:
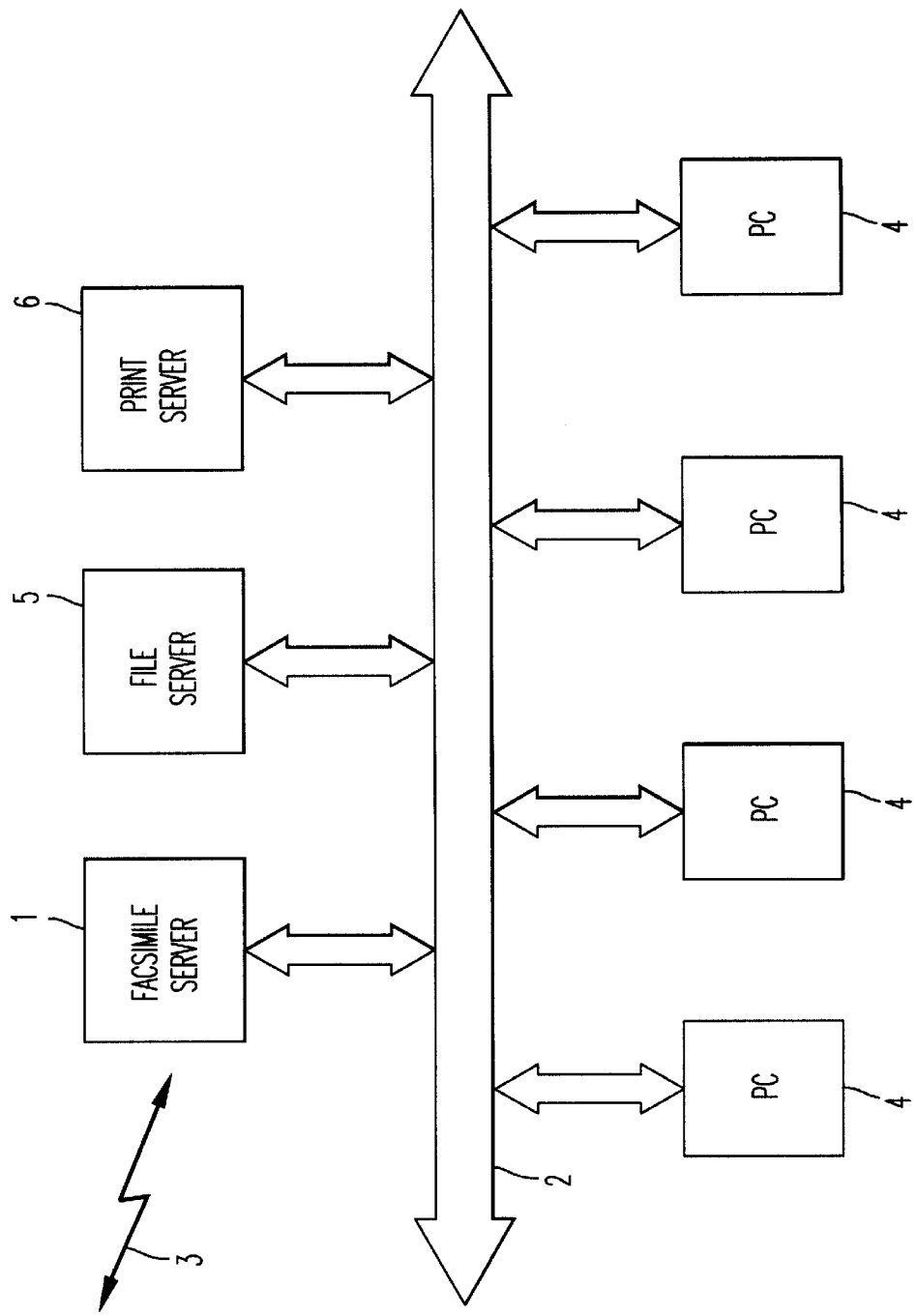
FIG. 1 is a system block diagram showing an interconnection of a facsimile server to a local area network (LAN) and public telephone networks, as an exemplary embodiment according to the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a system overview which includes a facsimile server 1, as an exemplary embodiment according to the present invention, connected to a LAN (local area network) 2 and public telephone networks 3 (including source terminals). More specifically, the facsimile server 1 in FIG. 1 is coupled to the LAN 2 wherein a number of PCs (personal computers) 4, or other information processing apparatuses, are connected as respective client terminals. This LAN 2 may also connect a file server 5 and a print server 6 as nodes on the LAN. The facsimile server 1 is further coupled to the public telephone networks 3, such as, for example, the public switched telephone network(PSTN), the integrated services digital network (ISDN), and wireless networks, in which a number of facsimile terminals are included.

Under this system structure, any one of many facsimile terminals accessible through the public telephone network 3 can transmit image information to any one of the PCs 4 through the above-mentioned connection of the facsimile server 1 to the LAN 2 and the public telephone networks 3. Specifically, the image information is first received by the facsimile server 1 and then transmitted therefrom via the LAN 2 to a designated one of the PCs 4. In reverse direction, any one of the PCs 4 on the LAN 2 can transmit image information to any one of the facsimile terminals through the above-mentioned connection of the facsimile server 1 to the LAN 2 and the public telephone networks 3. The file server 5 (e.g., another personal computer such as an BRAVO 66/2 manufactured by AST), includes a storage unit such as a hard disk drive, an optical disk drive, or the like, and functions as a shared memory by all the PCs 4. The print server 6 (e.g., a personal computer like the file server 5), includes, or has access to, a printing unit such as a laser printer, an ink-jet printer, or the like, as a printer shared by all the PCs 4 on the LAN 2. In addition, the facsimile server 1 is configured to transmit address information for each of the PCs 4 to a facsimile terminal (i.e., a "source" facsimile terminal) on the public telephone networks 3 when this source facsimile terminal sends image information and the facsimile server 1 fails to receive an address of a designated PC among the PCs 4 on the LAN 2.

Figure 2:
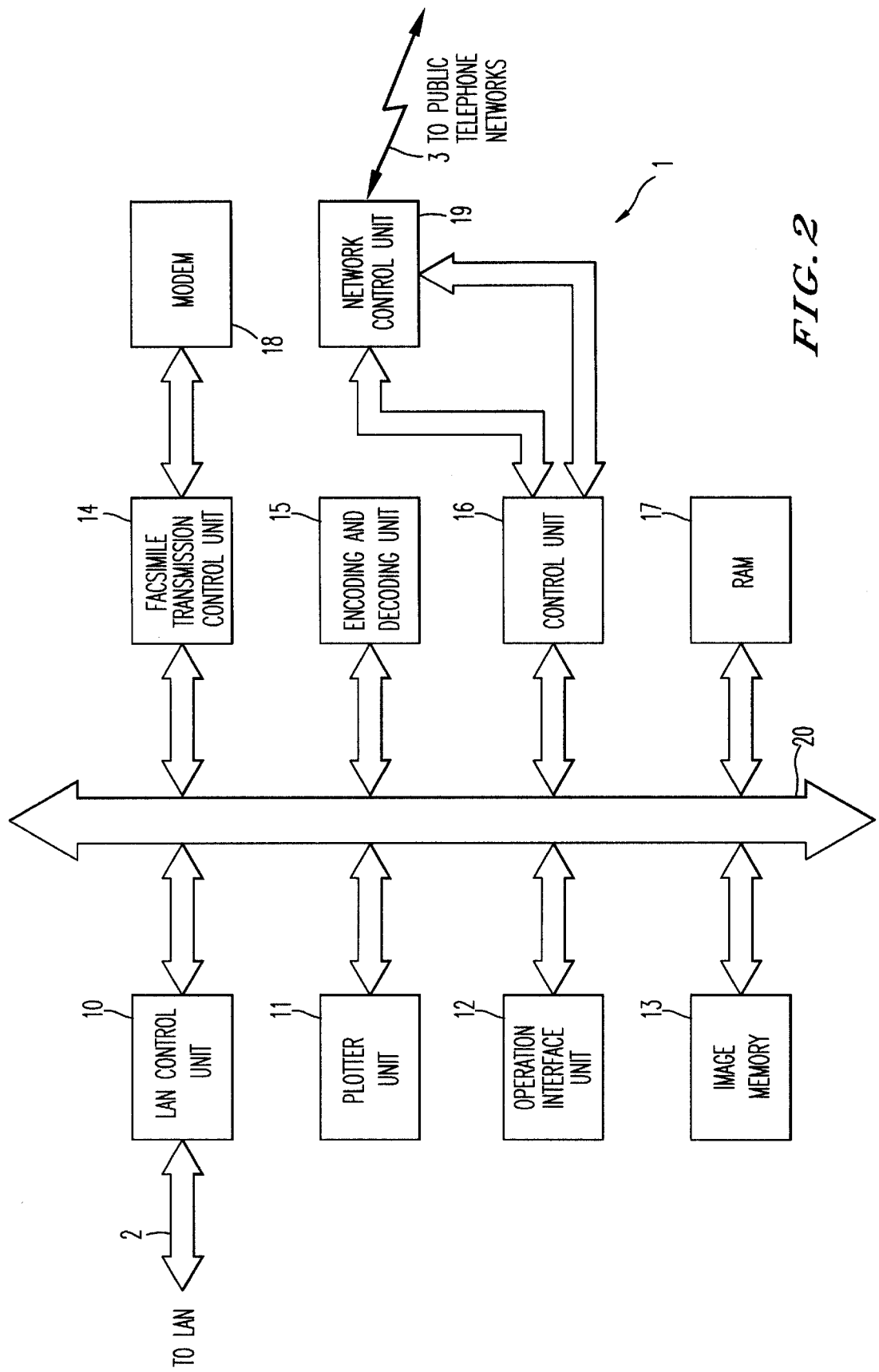
FIG. 2 is a functional block diagram of the facsimile server shown in FIG. 1.

Next, a main function of each functional unit included in the facsimile server 1 is explained with respect to FIG. 2. The facsimile server 1 in FIG. 2 is a microcomputer integrated equipment device, including the following functional units: a LAN control unit 10; a plotter unit 11; an operation interface unit 12; an image memory 13; a facsimile transmission control unit 14; an encoding and decoding unit 15; a control unit 16; a RAM 17; a modem 18; a network control unit 19; a bus line 20; and so forth.

The LAN control unit 10 controls communication among the PCs 4 on the LAN 2. The plotter unit 11 is a printing unit such as, for example, a laser printer (e.g., LaserJet 4 made by Hewlett Packard), and so forth, for printing various data. The operation interface unit 12 includes a data entry unit such as a keyboard, a touchpanel, a keypad, a mouse, and so forth for entering various kinds of operational information, and a display unit such as an LCD(liquid crystal display, or other display) for displaying various working pages, messages, and echoing the information input by the user in the operation interface unit.

The image memory 13 is used as a buffer memory for holding image data. The facsimile transmission control unit 14 controls receiving and transmission of image information to and from a facsimile terminal on the public telephone networks 3. The image memory is RAM semiconductor memory, or alternatively may be other semiconductor, optical, magnetic or other suitable medium for storing and retrieving the image data.

The encoding and decoding unit 15 encodes image information and the like, and decodes encoded data (i.e., the reverse process). The encoding and decoding unit 15 is a microprocessor, although a digital signal processor, application specific integrated circuit ASIC, field programmable gate array 9 FPGA) or the like may be used as well.

The control unit 16 controls an entire operation of the facsimile server 1. In particular, the control unit 16 transmits address information for the respective PCs 4 to a source facsimile terminal on the public telephone networks 3, according to the present invention.

The RAM 17 stores various kinds of data, for example, address information and user names in a form of an address list. Further, the RAM 17 stores telephone numbers and identification numbers of selected of the facsimile terminals accessible on the public telephone networks 3 in a form of a telephone number list and an identification number list, respectively.

The modem 18 modulates digital signal information so as to create an analog signal that is suitable for transmission through the public telephone networks 3. While receiving, the modem 18 demodulates a received analog signal so as to produce a corresponding digital signal composing data of image information.

The network control unit 19 controls connections of the facsimile server 1 to the public telephone networks 3.

The bus line 20 connects the above-mentioned functional units 10–17 each other, an example of which is a thin-line Ethernet coaxial cable and associated input/output terminals.

Next, FIG. 3 shows a hard-copy printout of the above-mentioned address list which is stored in the RAM 17. An exemplary address list 21 in FIG. 3 includes separate fields including (1) a local address used in the LAN 2, (2) a user name, and (3) another address which is referred to as a public address, for sake of convenience. Furthermore the address list 21 includes a facsimile server calling number field labeled "OUR FACSIMILE SERVER NO. 3324-123400", which contains the telephone number of the facsimile number by which the source facsimile terminal on the public telephone networks 3 may connect thereto. The public address is used by a source facsimile terminal on the public telephone networks 3 when originating a call to a client PC, from among the several PCs 4 so that image information may be transmitted thereto. Each entry for the three fields identified above contain information regarding a same PC from among the several PCs 4 on the LAN 2. The public address can be a sub-address of ISDN, a series of characters embedded in a TSI according to the CCITT Group 3 facsimile standard, a confidential identifier or proprietary identifier under the protocol of any communication standard other than CCITT Group 3 facsimile, or so forth. In addition, registration of an address into the above-mentioned address list in the RAM 17 can be made through the operation interface unit 12, or downloading from the PCs 4 on the LAN 2.

Figure 4:
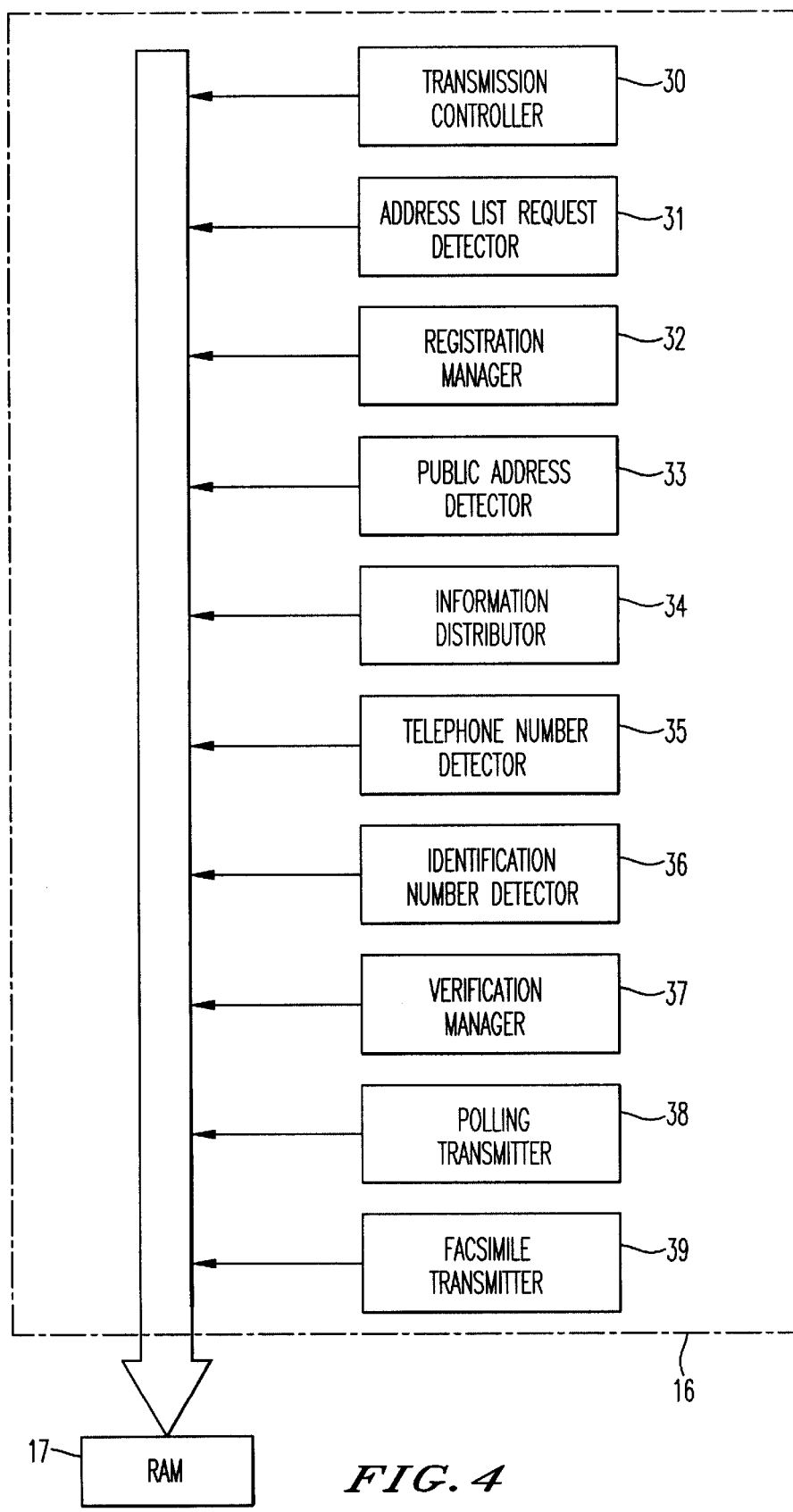
FIG. 4 is a functional block diagram of a control unit of the facsimile server.

Next, a main function of each functional element included in the control unit 16 of the facsimile server 1 is explained with respect to FIG. 4. The control unit 16 includes a transmission controller 30, an address list request detector 31, a registration manager 32, a public address detector 33, an information distributor 34, a telephone number detector 35, an identification number detector 36, a verification manager 37, a polling transmitter 38, and a facsimile transmitter 39. This control unit 16 is connected to the bus line 20 so that each of the above-mentioned elements 30–39 in the control unit 16 can exchange data with the RAM 17 and other units of the facsimile server 1 through the bus line 20.

The transmission controller 30, which includes a central processing unit (DSP chips and ASICs are example alternatives), controls an entire operation with respect to transmission of client addressees to facsimile terminals on the public telephone networks 3. The address list request detector 31 (using a computer-based software process although hardware equivalents are alternatives) detects an address list request message transmitted from a facsimile terminal on the public telephone networks 3. The registration manager 32 is also implemented as a computer-based software process, although hardware equivalents are alternatives. The registration manager 32 manages registration, updating, and deletion of (1) a local address, user name, and a public address to/from the address list 21 stored in the RAM 17, (2) a telephone number of a source facsimile terminal on the public telephone networks 3 into a telephone number list stored in the RAM 17, and (3) an identification number of the source facsimile terminal on the public telephone networks 3 into an identification number list stored in the RAM 17.

The public address detector 33 detects a public address transmitted from the source facsimile terminal. The information distributor 34 distributes image information to one of the PCs 4 on the LAN 2 designated by the public address detected by the public address detector 33. The telephone number detector 35 detects a telephone number of a facsimile terminal when the public address detector 33 fails to detect a public address from the source facsimile terminal during a time of receiving a call from this source facsimile terminal. The detector's 33 and 35, as well as the distributor 34 are implemented as computer based software processes, although hardware equivalents are alternatives.

The identification number detector 36 detects a identification number of a facsimile terminal when the public address detector 33 fails to detect a public address from the facsimile terminal during a time of receiving a call from the source facsimile terminal. The verification manager 37 manages verification of a telephone number detected by the telephone number detector 35 or an identification number detected by the identification number detector 36 against the telephone number list or identification number list, respectively, both of which are stored in the RAM 17. The detector 36 and manager 37 are implemented as computer based software processes, although hardware equivalents are alternatives.

The polling transmitter 38 transmits the address list 21 stored in the RAM 17 to a facsimile terminal on the telephone networks 3 in response to an address list request sent from the facsimile terminal during a polling transmission operational mode (explained hereinafter). The facsimile transmitter 39 transmits the address list 21 stored in the RAM 17 to the source facsimile terminal on the public telephone networks 3 when the facsimile server 1 detects that the source facsimile terminal transmits image information to one of the PC's 4 on the LAN 4 without specifying a public address of the PC 4. The transmitters 38 and 39 are implemented as computer based software processes, although hardware equivalents are alternatives.

More specifically, the functions performed by the polling transmitter 38 and the facsimile transmitter 39 are described below. As an example, a sequential operation is arranged in such a way that when the facsimile server 1 receives an address list request message from the source facsimile terminal for requesting the address list 21, the address list request detector 31 detects this address list request message and, subsequently, the polling transmitter 38 transmits the address list 21 back to the source facsimile terminal.

In this way, the facsimile server 1 is automatically configured to transmit information of the address list 21 of the PCs 4 back to any one of the facsimile terminals (which includes the source facsimile terminal) on the public telephone networks 3, in response to an address list request sent from the facsimile terminal. Thereby, the source facsimile terminal is instantly provided with such address list 21 by sending an address list request to the facsimile server 1 on the LAN 2 without having a time consuming communication. Consequently, the source facsimile terminal can properly specify a designated PC 4 with a public address in the address list 21 and transmit image information to the appropriate designated PC among the PCs 4 on the LAN 2.

Another example sequential process operation according to the present invention is such that the source facsimile terminal on the public telephone networks 3 sends image information to a designated PC among the PCs 4, following which the public address detector 33 of the facsimile server 1 seeks to find a public address sent from the source facsimile terminal, but fails to detect one. In this case, the telephone number detector 35 is arranged to detect a telephone number of the source facsimile terminal (e.g., using a "Caller ID" process). Subsequently, the facsimile transmitter 39 transmits the address list 21 back to the facsimile terminal in accordance with the telephone number detected by the telephone number detector 35.

Thus, the facsimile server 1 can automatically transmit information of the address list 21 of the PCs 4 back to any one of the facsimile terminals on the public telephone networks 3 (including the source facsimile terminal), by detecting that the source facsimile terminal did not provide an appropriate public address specifying a client PC (i.e., a designated PC) among the PCs 4 on the LAN 2. Although image information from the source facsimile terminal does not reach the designated PC, the source facsimile terminal is instantly provided with the address list 21 so that the designated PC may be specified, without having a time consuming, manually intensive communication afterwards. Thereby, the source facsimile terminal can properly specify a designated PC using a public address in the address list 21 and transmit image information to the appropriate designated PC among the PCs 4 on the LAN 2.

Yet another example sequential process operation according to the present invention is such that the source facsimile terminal on the public telephone networks 3 sends image information to the designated PC which is one of the PCs 4 on the LAN 2. After the image information is sent, the public address detector 33 of the facsimile server 1 seeks to find a public address from the information sent by the source facsimile terminal, but fails (perhaps because the PC was never designated in the information sent by the source facsimile terminal), yet a telephone number of the source facsimile terminal was previously registered in the RAM 17 of the facsimile server 1. In such a case, the telephone number detector 35 is arranged to detect the telephone number of the source facsimile terminal which is subsequently verified. Only when the telephone number detected by the telephone number detector 35 is verified with the telephone number list stored in the RAM 17 by the verification manager 37, the facsimile transmitter 39 transmits the address list 21 back to the source facsimile terminal in accordance with the telephone number detected by the telephone number detector 35.

Thus, the facsimile server 1 can automatically transmit a message containing the address list 21 of the PCs 4 on the LAN 2 back to any one of the facsimile terminals on the public telephone networks 3, when it is detected that the source facsimile terminal did not designate an appropriate public address of a client PC among the PCs 4 on the LAN 2 and when the telephone number of the sending facsimile terminal is verified with the telephone number list stored in the RAM 17. Although image information from the source facsimile terminal does not initially reach the designated PC, the source facsimile terminal is instantly provided with the address list 21 without requiring operator intervention and a time consuming communication afterwards. Consequently, the source facsimile terminal can properly specify a designated PC with a public address in the address list 21 and transmit image information to the appropriate designated PC among the PCs 4 on the LAN 2.

Still another example sequential process operation according to the present invention is such that the facsimile terminal on the public telephone networks 3 sends image information to a designated PC among the PCs 4 on the LAN 2, following which the public address detector 33 of the facsimile server 1 seeks a public address from the facsimile terminal, but fails, yet an identification number of the facsimile terminal is previously stored in the RAM 17 of the facsimile server 1 and the identification number of the facsimile terminal is verified with the identification number list previously stored in the RAM 17. In this case, the identification number detector 36 is configured to detect an identification number of the facsimile terminal which is subsequently verified. Only when the identification number detected by the identification number detector 36 is verified with the identification number list stored in the RAM 17 by the verification manager 37, the facsimile transmitter 39 transmits the address list 21 back to the source facsimile terminal in accordance with a telephone number detected through the identification number detected by the identification number detector 36.

Thus, the facsimile server 1 can automatically transmit a message including the address list 21 of the PCs 4 on the LAN 2 back to any one of the facsimile terminals on the public telephone networks 3, by detecting that the sending facsimile terminal did not designated an appropriate public address specifying a client PC among the PCs 4 on the LAN 2 and that the identification number of the source facsimile terminal is verified with the identification number list stored in the RAM 17. Although image information from the facsimile terminal does not reach the designated PC, the facsimile terminal is instantly provided with the address list 21 without requiring manual intervention and time consuming communication afterwards. Consequently, the source facsimile terminal can properly specify a designated PC with a public address in the address list 21 and transmit image information to the appropriately designated PC among the PCs 4 on the LAN 2.

Figure 5B:
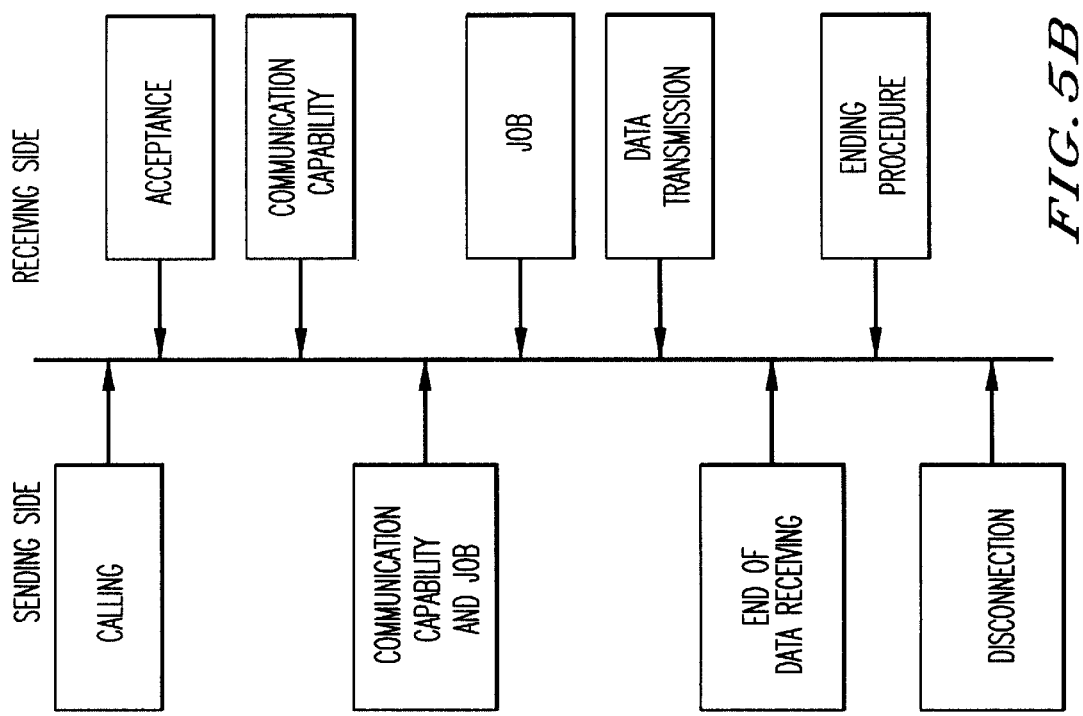
FIGS. 5(a) and 5(b) are signal protocol diagram illustrations showing a facsimile communication procedure during an ordinary facsimile transmission mode and during a polling transmission mode, respectively.
Figure 5A:
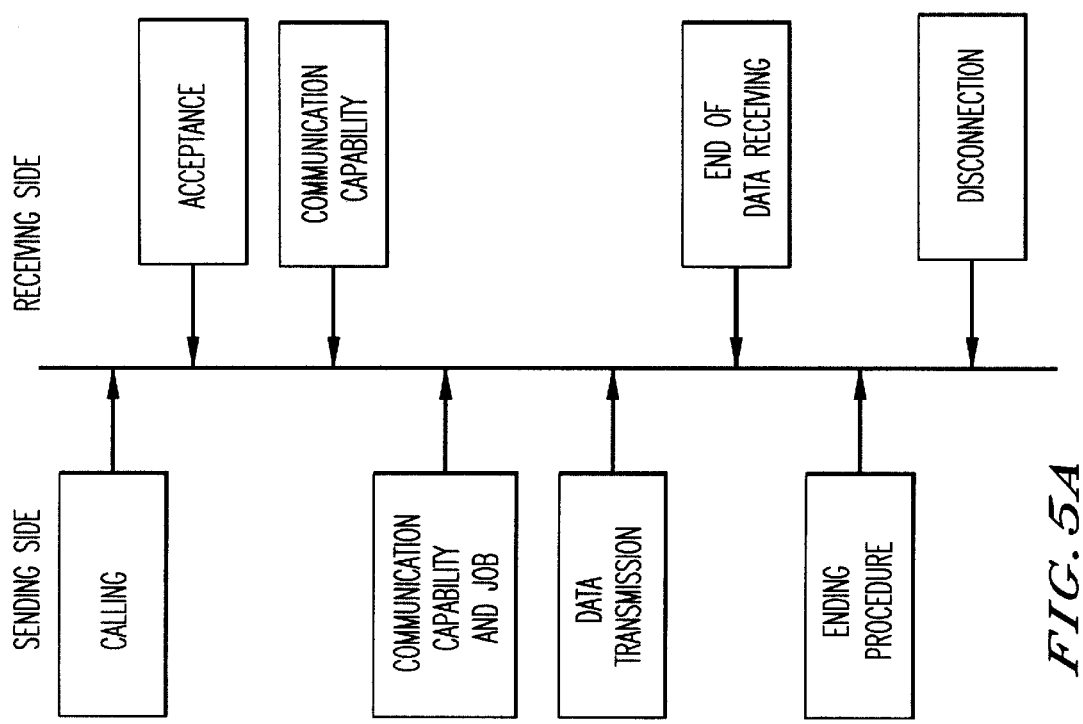

Next, signaling procedures for transmission between a first facsimile and another facsimile under a polling transmission operation mode and an ordinary facsimile transmission are explained with respect to FIGS. 5(b) and 5(a), respectively. FIG. 5(a) explains a flow of an ordinary facsimile transmission case, in which a sending facsimile side (a source facsimile) originates a call ("calling"). In response, a receiving facsimile side (destination facsimile or server) responds with an acceptance and subsequently sends information about the communication capabilities of the destination facsimile. The sending facsimile side responds by sending information on the communication capabilities of the source facsimile terminal and jobs (e.g., tasks and processes) to be taken place. The source facsimile then starts to send data to the receiving facsimile side. Upon completion of data transmission, the receiving facsimile side sends a signal for ending, and in response the sending facsimile side sends a process termination signal back to the receiving facsimile side which then disconnects the line.

FIG. 5(b) explains a flow of a polling transmission case, in which a sending facsimile side originates a call and a receiving facsimile side then send back an acceptance following which the receiving facsimile side sends information on the communication capabilities of the receiving side facsimile terminal. Subsequently, the sending facsimile side responds by sending information on the communication capabilities of the source facsimile, jobs to be taken place, and a polling transmission request. Then, the receiving facsimile side sends a job description to be taken place and starts to send data to the sending facsimile side. Upon completion of the data transmission, the sending facsimile side sends a signal for ending the polling operation, and in response the receiving facsimile side sends a process termination signal back to the sending facsimile side which then disconnects the line.

Figure 6:
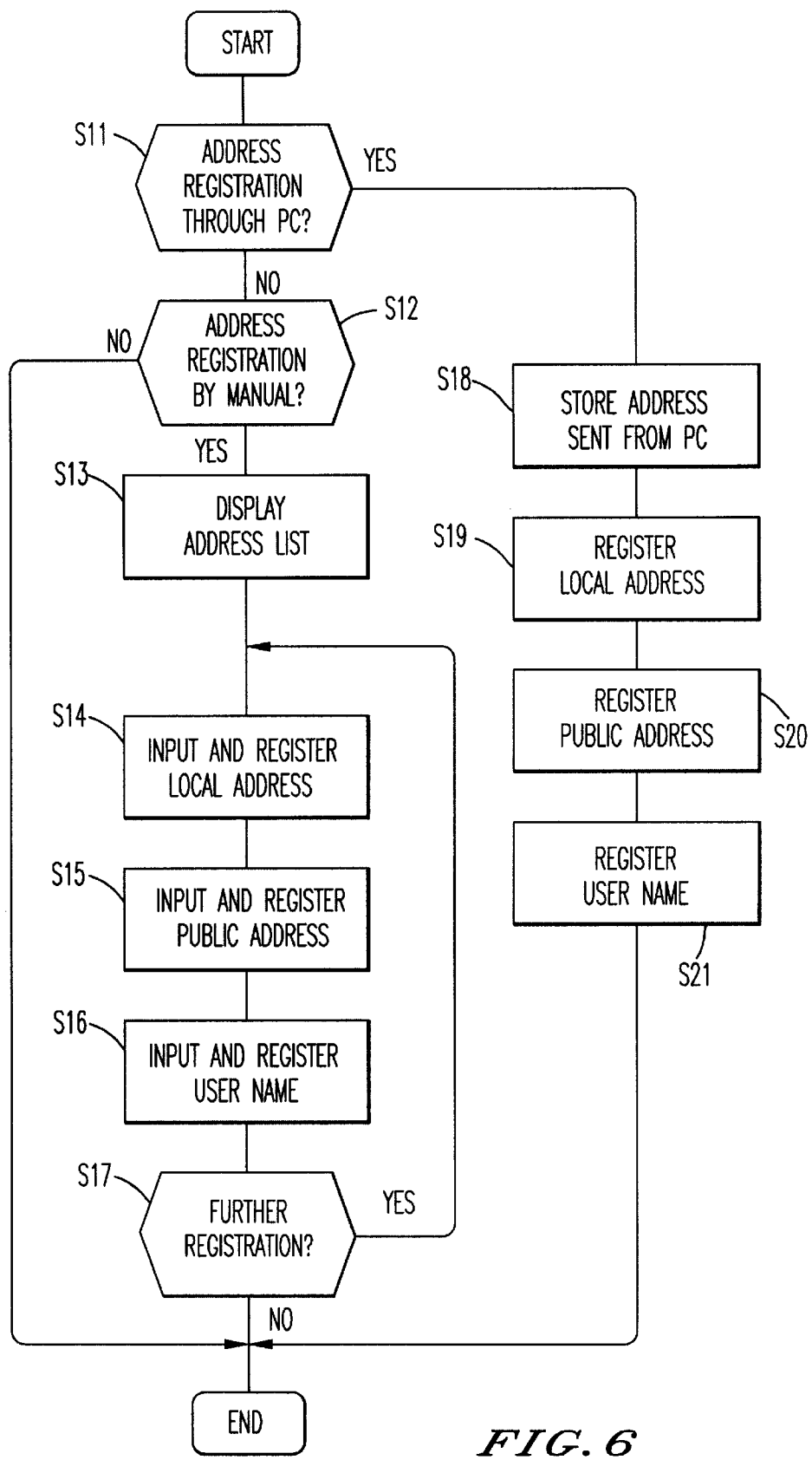
FIG. 6 is a flowchart of a registration procedure for registering the address list.

Next, an operational signal flow for registration of a local address, a public address, and a user name into the address list 21 is explained with respect to FIG. 6. As is mentioned hereinbefore, the address list 21 includes a local address, a public address, and a user name in this embodiment, for example. Additionally, registration can be made either by manually inputting data from the operation interface unit 12 or by receiving data from client PCs 4 through the LAN 2. The process begins in Step S11 the transmission controller 30 inquires whether an address registration request is sent from any one of the PCs 4 on the LAN 2. If the response to the inquiry is YES, the process flows to Step S18 where the transmission controller 30 instructs the registration manager 32 to temporarily store registration information in a temporary space in the RAM 17 and, afterwards, to register each piece of information into an appropriate place in the RAM 17. Accordingly, the registration manager 32 stores a local address, a public address, and a user address into the respective places in the RAM 17, in Steps S19, S20, and S21, respectively.

If the response to the inquiry in Step S11 is NO, the process flows to Step S12, where the transmission controller 30 determines whether an address registration request is manually entered through the operation interface unit 12. If the response to the inquiry in Step S12 is NO, the process ends. If the response to the inquiry in Step S12 is YES, the process flows to Step S13 where the transmission controller 30 instructs the registration manager 32 to display the address list 21 stored in the RAM 17 on the operation interface unit 12 for enabling an operator to input data. The process then proceeds to Steps S14, S15, and S16 in sequence where the registration manager 32 registers a local address, a public address, and a user name into the respective places in the RAM 17. The process then proceeds to Step S17 where the registration manager 32 confirms whether no further registration is needed. If the response to the inquiry in Step S17 is YES, the process returns to Step S14. If the response to the inquiry in Step S17 is NO, the process ends. In this way, registration of a local address, a public address, and a user name into the address list 21 stored in the RAM 17 is managed by the registration manager 32, either by manually inputting data from the operation interface unit 12 or by receiving data from client PCs 4 through the LAN 2.

In addition, a change of a local address, a public address, and a user name in the address list 21 by deleting or modifying may also have a similar flow shown in FIG. 6. Moreover, other information lists, such as, for example, a telephone number list, an identification number list, and so forth, for mostly verifying a calling party from outside the LAN 2 may have a similar flow to that shown in FIG. 6 for registration and information change.

Figure 7:
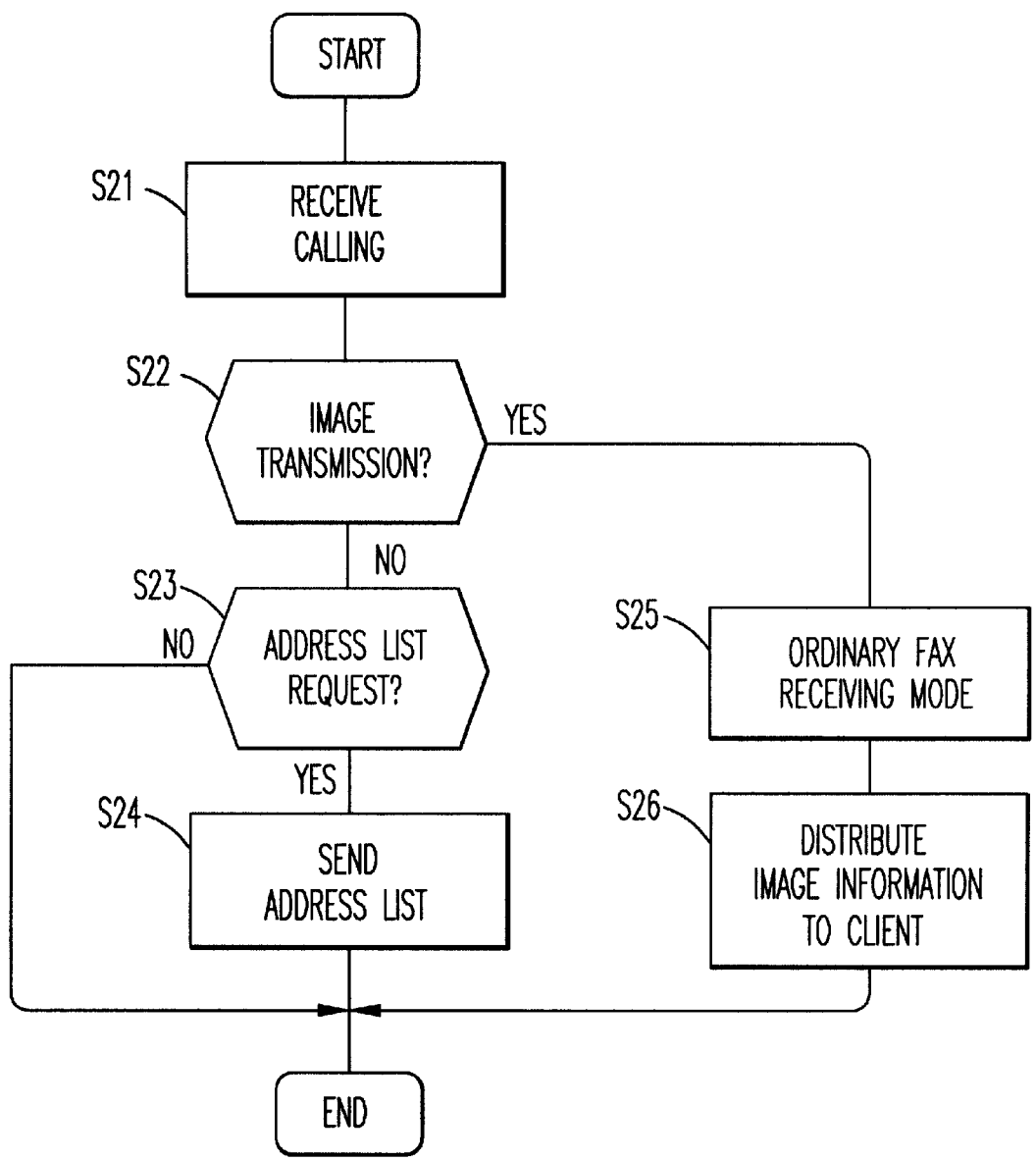
FIG. 7 is a flowchart of a procedure for transmitting the address list under the polling transmission mode when the facsimile server receives a request message from a source facsimile terminal via the public telephone networks.

Next, an operational signal flow of the polling transmission of the address list 21 from the RAM 17 in response to an address list request message from a facsimile terminal according to the present invention is explained with respect to FIG. 7. The process begins in Step S21 where the facsimile server 1 receives a call from a source facsimile terminal on the public telephone networks 3. The process then flows to Step S22 where the transmission controller 30 inquires whether the call is of a transmission of image information from the source facsimile terminal. If the response to the inquiry in Step S22 is YES, the process flows to Step S2 where the transmission controller requests the LAN controller 10, the facsimile transmission control unit 14, the encoding and decoding unit 15, and other functional units of the facsimile server 1 to follow an ordinary procedure for receiving image information. After a completion of receiving the image information, the facsimile server 1 transmits the image information to a designated client among the PCs 4 on the LAN 2 in Step S26. Then, the process ends.

If the response to the inquiry in Step S22 is NO, the transmission controller 30 inquires in Step S23 whether the call is an address list request message from the source facsimile terminal. If the response to the inquiry in Step S23 is YES, the process flows to Step S24 where the transmission controller 30 instructs the polling transmitter 38 to transmit the address list 21 stored in the RAM 17 to the source facsimile terminal on the public telephone networks 3, through the encoding and decoding unit 15 in which the address list 21 is decoded into image information. The process then ends. If the response to the inquiry in Step S23 is NO, the process ends. The above-mentioned address list request message may be represented by various commands of facsimile standards, such as, for example, DTC (digital transmit command), CIG (calling subscriber identification), and NSC (non standard facilities command), as defined by the CCITT.

In this way, the facsimile server 1 can automatically transmit the address list 21 of the PCs 4 on the LAN 2 back to any one of the facsimile terminals on the public telephone networks 3, in response to an address list request message sent from a source facsimile terminal. Thereby, the source facsimile terminal is instantly provided with the address list 21 by sending an address list request message to the facsimile server 1 without requiring manual intervention or a time consuming communication. Consequently, the source facsimile terminal can properly specify a designated PC with a public address in the address list 21 and transmit image information to an appropriate designated PC among the PCs 4 on the LAN 2.

Figure 8:
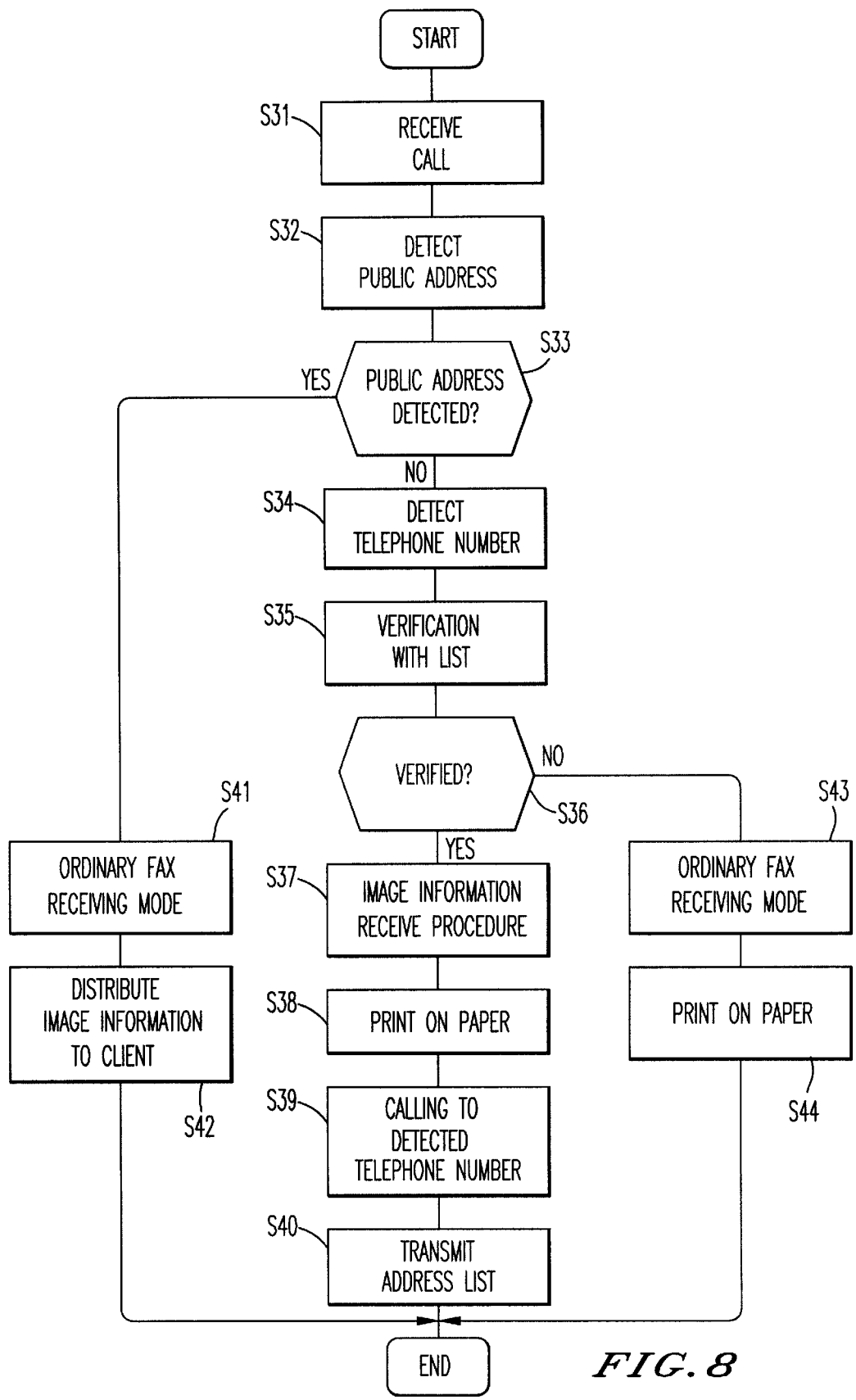
FIG. 8 is a flowchart of a procedure for transmitting the address list during the ordinary facsimile transmission mode when the facsimile server receives image information from a source facsimile which did not specify a calling number of an information processing apparatus.

Next, an operational signal flow of a facsimile transmission of the address list 21, with information security by telephone number verification, according to the present invention is explained with respect to FIG. 8. The process begins in Step S31 where the facsimile server 1 on the LAN 2 receives a call including image information intended for a PC of the PCs 4 on the LAN 2 from the source facsimile terminal on the public telephone networks 3. The process then flows to Step S32 where the transmission controller 30 instructs the public address detector 33 to detect a public address of a designated PC sent from the facsimile terminal. The process then flows to Step S33 where the transmission controller 30 inquires whether a public address of a designated PC is detected by the public address detector 33. If the response to the inquiry in Step S33 is YES, the transmission controller 30 in Step S41 requests the LAN controller 10, the facsimile transmission control unit 14, the encoding and decoding unit 15, and other functional units of the facsimile server 1 to proceed with an ordinary procedure for receiving image information from the source facsimile terminal. From Step S41, the process flows to Step S42 where the received image information is transmitted to the designated PC among the PCs 4 on the LAN 2 in accordance with a local address in the address list 21 combined with the public address detected by the public address detector 33.

If the response to the inquiry in Step S33 is NO, the process flows to Step S34 where the transmission controller 30 instructs the telephone number detector 35 to detect, a telephone number of the sending facsimile terminal and the verification manager 37 to verify, in Step S35, the telephone number of the source facsimile terminal against the telephone number list previously stored in the RAM 17. After Step S35, the process proceeds to Step S36 where the transmission controller 30 in Step S36 inquires whether the telephone number of the source facsimile terminal is verified with the telephone number list previously stored in the RAM 17. If the response to the inquiry in Step S36 is NO, the process proceeds to Step S43 where the transmission controller 30 requests the LAN controller 10, the facsimile transmission control unit 14, the encoding and decoding unit 15, and other functional units of the facsimile server 1 to perform an ordinary procedure for receiving image information. Then, the process proceeds to Step S44 where the transmission controller 30 requests the plotter unit 11 to output the received image information on paper, and then the process ends.

If the response to the inquiry in Step S36 is YES, the process proceeds to Step S37 where the transmission controller 30 requests the LAN controller 10, the facsimile transmission control unit 14, the encoding and decoding unit 15, and other functional units of the facsimile server 1 to follow the ordinary procedure of receiving image information. The process then proceeds to Step S38 where the transmission controller 30 requests the plotter unit 11 to output the received image information on paper. Then, the transmission controller 30 in Step S39 instructs the network control unit 19 to originate a call to the sending facsimile terminal using the detected telephone number by the telephone number detector 35. Subsequently, the transmission controller 30 in Step S40 instructs the facsimile transmission control unit 14, the modem unit 18, the network control unit 19, and other functional control units of the facsimile server 1 to transmit the address list 21 to the sending facsimile terminal on the public telephone networks 3, and then the process ends.

Thus, the facsimile server 1 can automatically transmit a message with the address list 21 of the PCs 4 on the LAN 2 back to any one of the facsimile terminals on the public telephone networks 3, by detecting that the sending facsimile terminal did not include a public address specifying a client PC from among the PCs 4 on the LAN 2 and that the telephone number of the sending facsimile terminal is verified with the telephone number list previously stored in the RAM 17. Although image information from the source facsimile terminal did not originally reach a designated PC, the facsimile terminal is instantly provided with the address list 21 without requiring manual interaction or having a time consuming communication afterwards. Consequently, the sending facsimile terminal can properly specify a designated PC with a public address in the address list 21 and transmit image information to the appropriate designated PC among the PCs 4 on the LAN 2.

In addition, arranging an operation of telephone number verification as described above, increased security over the unauthorized distribution of the address list 21 is improved because the address list 21 is distributed only when the party to which the address list is sent is first verified as being an authorized recipient.

Figure 9:
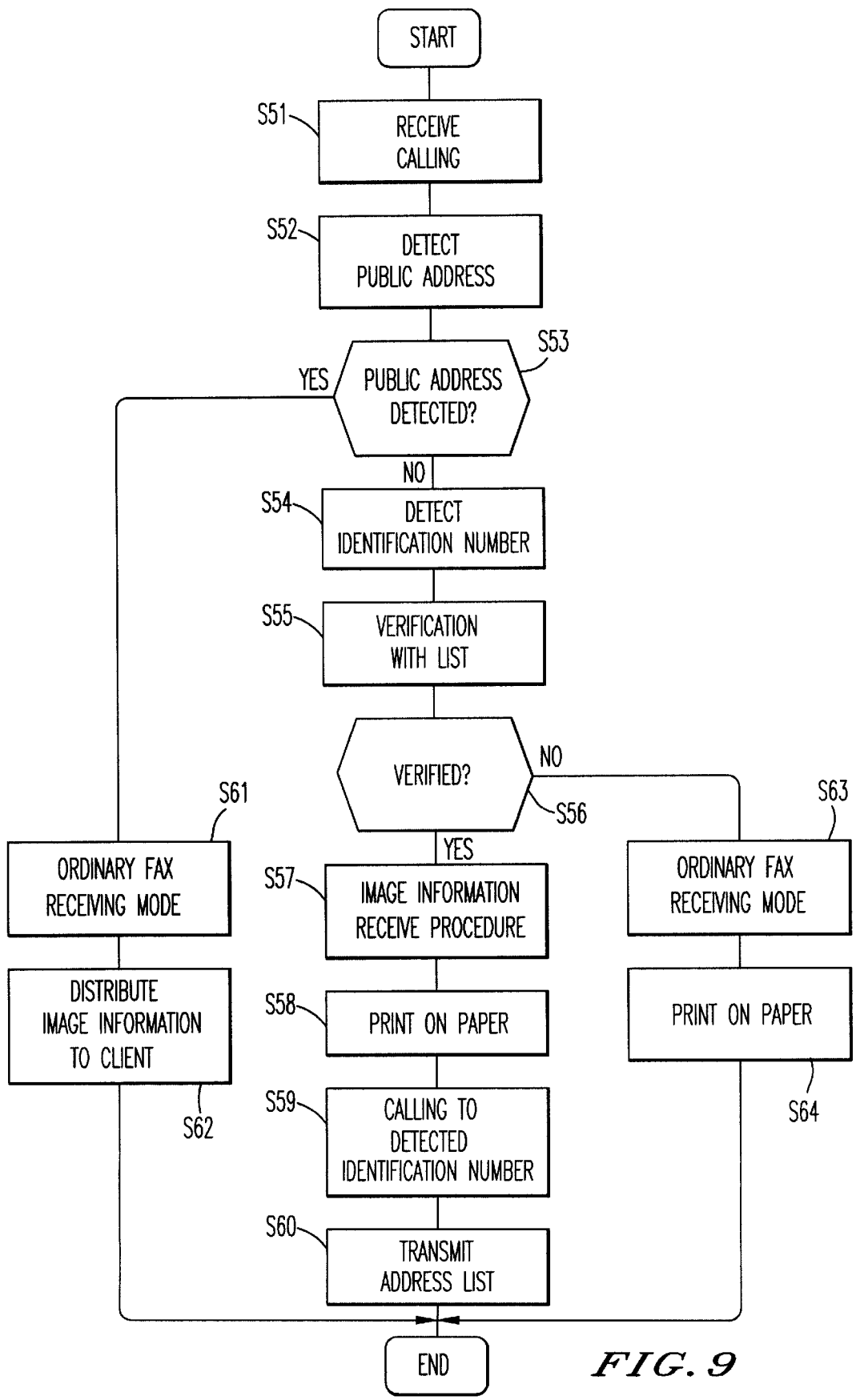
FIG. 9 is a flowchart of a procedure for transmitting the address list during the ordinary facsimile transmission mode when the facsimile server receives image information from the source facsimile terminal without specifying a calling number of an information processing apparatus.

Next, an operational signal flow of facsimile transmissions of the address list 21 with information security by identification number verification according to the present invention is explained with respect to FIG. 9. The process begins in Step S51 where the facsimile server 1 on the LAN 2 receives a call containing image information destined for a designated PC among the PCs 4 on the LAN 2 from the source facsimile terminal on the public telephone networks 3. The process then proceeds to Step S52 where the transmission controller 30 instructs the public address detector 33 to detect a public address of the designated PC sent from the source facsimile terminal. The process then proceeds to Step S53 where an inquiry is made regarding whether the public address is detected by the public address detector 33. If the response to the inquiry in Step S53 is YES, the process proceeds to Step S61 where the transmission controller 30 requests the LAN controller 10, the facsimile transmission control unit 14, the encoding and decoding unit 15, and other functional units of the facsimile server 1 to follow an ordinary procedure for receiving image information from the source facsimile terminal. The process then proceeds to Step S62 where the received image information is then transmitted to the designated PC among the PCs 4 on the LAN 2, and then the process ends.

If the response to the inquiry in Step S53 is NO, the process flows to Step S54 where the transmission controller 30 instructs the identification number detector 36 to detect an identification number of the sending facsimile terminal. Subsequently, the verification manager 37 verifies in Step S55 the identification number of the sending facsimile terminal against the identification number list previously stored in the RAM 17. The process then flows to Step 56 where the transmission controller 30 inquires whether the identification number of the sending facsimile terminal is verified with the identification number list previously stored in the RAM 17. If the response in Step S56 is NO, the process flows to Step S63 where the transmission controller 30 requests the LAN controller 10, the facsimile transmission control unit 14, the encoding and decoding unit 15, and other functional units of the facsimile server 1 follow an ordinary procedure of receiving image information. Then, the process flows to Step S64 where the transmission controller 30 requests the plotter unit 11 output the received image information on paper, and the process ends.

However, if the response to the inquiry in Step S56 is YES, the process flows to Step S57 where the transmission controller 30 requests the LAN controller 10, the facsimile transmission control unit 14, the encoding and decoding unit 15, and other functional units of the facsimile server 1 to follow an ordinary procedure for receiving image information. Subsequently, process flows to Step S58 where the transmission controller 30 requests the plotter unit 11 to output the received image information on paper. Then the process flows to Step S59 where the transmission controller 30 instructs the network control unit 19 to originate a call to the sending facsimile terminal using the identification number detected by the identification number detector 36. The process then flows to Step S60 where the transmission controller 30 instructs the facsimile transmission control unit 14, the modem unit 18, the network control unit 19, and other functional control units of the facsimile server 1 to transmit the address list 21 to the sending facsimile terminal on the public telephone networks 3 in accordance with the identification number detected by the identification number detector 36. Afterwards, the process ends.

Thus, the facsimile server 1 automatically transmits information including the address list 21 of the PCs 4 on the LAN 2 back to any one of the facsimile terminals on the public telephone networks 3, by detecting that the sending facsimile terminal did not have a public address specifying a client PC from among the PCs 4 on the LAN 2 and that the identification number of the sending facsimile terminal is verified with the identification number list previously stored in the RAM 17. Although image information from the facsimile terminal did not reach the designated PC, the facsimile terminal is instantly provided with a message including the address list 21 without requiring manual intervention and having a time consuming communication afterwards. Consequently, the sending facsimile terminal can properly specify a designated PC with a public address in the address list 21 and transmit image information to the appropriate designated PC among the PCs 4 on the LAN 2. If originating a call in Step S59, the telephone number of the sending facsimile terminal detected by the telephone number detector 34 can be used even though this process is not expressly shown in FIG. 9. Alternatively, a telephone number in the telephone number list and a corresponding identification number previously stored in the RAM 17, and an appropriate telephone number of the sending facsimile terminal can be fetched by the transmission controller 30 through this combined list when a call is originated to the sending facsimile terminal.

In addition, in light of the identification number verification process described above, a security integrity of the transmission of the address list 21 is maintained because the address list 21 is transmitted only when the party to which the address list is sent has first been verified.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. An apparatus configured to relay information between a source terminal connected to the apparatus through a communication line and a destination terminal connected to said apparatus through a network, comprising:

first storing means for storing an address list including respective address entries for the destination terminal and other terminals on the network, each of said address entries comprising a destination calling number and a corresponding local number used within said network to identify a same one of the destination terminal and the other terminals;

data entry means for entering data;

registration control means for controlling a registration and a change of the entries in the address list as input through said data entry means;

first detecting means for detecting a request message sent from said source terminal, said request message sent during a transmission operational mode and indicative of a request to receive at said source terminal said address list;

second detecting means for detecting a source terminal calling number when the first detecting means detects the request message and when image information is received from said source terminal;

third detecting means for detecting one of the destination calling numbers corresponding to the destination terminal from an image information message sent from said source terminal;

a communication line interface connected to said communication line;

a network interface connected to said network; and transmission control means for transmitting said address list through said communication line interface to said source terminal in accordance with the source facsimile calling number only when said first detection means detects said request message.

2. An apparatus according to claim 1, further comprising:

transmission means for transmitting to the source terminal said address list during an ordinary facsimile operational mode; and wherein said transmission control means includes means for instructing said transmission means to transmit said address list to said source terminal in accordance with the source terminal calling number detected by said second detecting means only when said third detecting means fails to detect a calling number of the destination terminal to which the facsimile terminal sends image information.

3. An apparatus according to claim 2, further comprising:

verifying means for verifying a source terminal calling number detected by said second detecting means with a calling number list, wherein, said first storing means for previously storing the calling number list of the source facsimile terminal and other terminals on a public telephone network connected to said communication line;

said transmission control means for instructing said transmission means to transmit said address list to said source terminal in accordance with the source terminal calling number detected by said second detecting means only when said third detecting means fails to detect said one of the destination calling numbers corresponding to the destination terminal to which the source facsimile terminal sends image information and when the source terminal calling number detected by said second detecting means is verified with said calling number list previously stored in said first storing means.

4. An apparatus according to claim 3, wherein said calling number list previously stored in said first storing means comprises a list of specific identification numbers based on an agreement between a user of said source terminal and a user of said apparatus.

5. An apparatus according to claim 1, wherein said communication line interface is configured to connect to at least one of a public switched telephone network, an integrated services digital network, and a wireless network.

6. An apparatus according to claim 2, wherein said communication line interface is configured to connect to at least one of a public switched telephone network, an integrated services digital network, and a wireless network.

7. An apparatus according to claims 3, wherein said communication line interface is configured to connect to at least one of a public switched telephone network, an integrated services digital network, and a wireless network.

8. An apparatus according to claims 4, wherein said communication line interface is configured to connect to at least one of a public switched telephone network, an integrated services digital network, and a wireless network.

9. An apparatus according to claim 1, wherein said one of the destination calling numbers corresponding to the destination terminal calling number comprises a sub-address defined by an integrated services digital network.

10. An apparatus according to claim 2, wherein said one of the destination calling numbers corresponding to the destination terminal calling number comprises a sub-address defined by an integrated services digital network.

11. An apparatus according to claim 3, wherein said one of the destination calling numbers corresponding to the destination terminal calling number comprises a sub-address defined by an integrated services digital network.

12. An apparatus according to claim 4, wherein said one of the destination calling numbers corresponding to the destination terminal calling number comprises a sub-address defined by an integrated services digital network.

13. An apparatus according to claim 5, wherein said one of the destination calling numbers corresponding to the destination terminal calling number comprises a sub-address defined by an integrated services digital network.

14. An apparatus according to claim 6, wherein said one of the destination calling numbers corresponding to the destination terminal calling number comprises a sub-address defined by an integrated services digital network.

15. An apparatus according to claim 7, wherein said one of the destination calling numbers corresponding to the destination terminal calling number comprises a sub-address defined by an integrated services digital network.

16. An apparatus according to claim 8, wherein said one of the destination calling numbers corresponding to the destination terminal calling number comprises a sub-address defined by an integrated services digital network.

17. An apparatus according to claim 1, wherein said one of the destination calling numbers corresponding to the destination terminal calling number comprises a direct dial number.

18. An apparatus according to claim 2, wherein said one of the destination calling numbers corresponding to the destination terminal calling number comprises a direct dial number.

19. An apparatus according to claim 3, wherein said one of the destination calling numbers corresponding to the destination terminal calling number comprises a direct dial number.

20. An apparatus according to claim 4, wherein said one of the destination calling numbers corresponding to the destination terminal calling number comprises a direct dial number.

21. An apparatus according to claim 5, wherein said one of the destination calling numbers corresponding to the destination terminal calling number comprises a direct dial number.

22. An apparatus according to claim 6, wherein said one of the destination calling numbers corresponding to the destination terminal calling number comprises a direct dial number.

23. An apparatus according to claim 7, wherein said one of the destination calling numbers corresponding to the destination terminal calling number comprises a direct dial number.

24. An apparatus according to claim 8, wherein said one of the destination calling numbers corresponding to the destination terminal calling number comprises a direct dial number.

25. An apparatus according to claim 1, wherein said one of the destination calling numbers corresponding to the destination terminal calling number comprises characters embedded in a transmitting subscriber identification field defined by a CCITT Group 3 facsimile standard.

26. An apparatus according to claim 2, wherein said one of the destination calling numbers corresponding to the destination terminal calling number comprises characters embedded in a transmitting subscriber identification field defined by a CCITT Group 3 facsimile standard.

27. An apparatus according to claim 3, wherein said one of the destination calling numbers corresponding to the destination terminal calling number comprises characters embedded in a transmitting subscriber identification field defined by a CCITT Group 3 facsimile standard.

28. An apparatus according to claim 4, wherein said one of the destination calling numbers corresponding to the destination terminal calling number comprises characters embedded in a transmitting subscriber identification field defined by a CCITT Group 3 facsimile standard.

29. An apparatus according to claim 5, wherein said one of the destination calling numbers corresponding to the destination terminal calling number comprises characters embedded in a transmitting subscriber identification field defined by a CCITT Group 3 facsimile standard.

30. An apparatus according to claim 6, wherein said one of the destination calling numbers corresponding to the destination terminal calling number comprises characters embedded in a transmitting subscriber identification field defined by a CCITT Group 3 facsimile standard.

31. An apparatus according to claim 7, wherein said one of the destination calling numbers corresponding to the destination terminal calling number comprises characters embedded in a transmitting subscriber identification field defined by a CCITT Group 3 facsimile standard.

32. An apparatus according to claim 8, wherein said one of the destination calling numbers corresponding to the destination terminal calling number comprises characters embedded in a transmitting subscriber identification field defined by a CCITT Group 3 facsimile standard.

33. The apparatus of claim 1, wherein said address list includes a user name field, a facsimile server calling number field, a calling number field and a corresponding local number field for each address entry, so as to specify respective of the destination terminal and the other terminals connected to the network.

34. The apparatus of claim 1, wherein said registration control means is for controlling the registration and the change of the entries by transmitting data from at least one of the destination terminal and other terminals through said communication line interface.

35. The apparatus of claim 1, further comprising;

first transmission means for transmitting image information sent from the source terminal to the destination terminal addressed by the source terminal with the destination calling number and for receiving data from the destination terminal and the other terminals on the network.

36. The apparatus of claim 35 further comprising second transmission means for transmitting said address list during the polling operational mode to the source facsimile terminal.

37. The apparatus of claim 1, wherein said first detecting means for detecting said request message during a polling operational mode.

38. An apparatus configured to relay information between a source terminal connected to the apparatus through a communication line and a destination terminal connected to said apparatus through a network, comprising:

a storage device that holds an address list including respective address entries for the destination terminal and other terminals on the network, each of said address entries comprising a destination calling number and a corresponding local number used within said network to identify a same one of the destination terminal and the other terminals;

a data input;

a registration controller that controls which addresses are included in the address list;

a detector that detects one of the destination calling numbers corresponding to the destination terminal from an image information message sent from said source terminal a communication line interface connected to said communication line;

a network interface connected to said network; and a transmission controller that controls a transmission of said address list through said communication line to said source terminal when the source terminal sends the image information message and the apparatus fails to receive an address of the destination terminal so an operator at said source terminal may select one or more of the other terminals from the address list.

39. An apparatus according to claim 38, further comprising:

a verification controller that verifies whether a source terminal calling number is included on a calling number list, wherein, said storage device holds the calling number list of the source facsimile terminal and other terminals on a public telephone network connected to said communication line;

said transmission controller instructs said transmitter to transmit said address list to said source terminal in accordance with the source terminal calling number only when said detector fails to detect said one of the destination calling numbers corresponding to the destination terminal to which the source facsimile terminal sends image information and when the source terminal calling number is verified with said calling number list previously stored in said storage device.

40. An apparatus according to claim 39, wherein said calling number list previously stored in said storage device comprises a list of specific identification numbers on an agreement between a user of said source terminal and a user of said apparatus.

41. An apparatus according to claim 38, wherein said communication line interface is configured to connect to at least one of a public switched telephone network, an integrated services digital network, and a wireless network.

42. An apparatus according to claim 38, wherein said one of the destination calling numbers corresponding to the destination terminal calling number comprises a sub-address defined by an integrated services digital network.

43. An apparatus according to claim 38, wherein said one of the destination calling numbers corresponding to the destination terminal calling number comprises a direct dial number.

44. An apparatus according to claim 38, wherein said one of the destination calling numbers corresponding to the destination terminal calling number comprises characters embedded in a transmitting subscriber identification field defined by a CCITT Group 3 facsimile standard.

45. The apparatus of claim 38, wherein said address list includes a user name field, a facsimile server calling number field, a calling number field and a corresponding local number field for each address entry, so as to specify respective of the destination terminal and the other terminals connected to the network.

46. The apparatus of claim 38, wherein said registration controller controls the registration and the change of the entries by transmitting data from at least one of the destination terminal and other terminals through said communication line interface.

47. A method for relaying information via a relay terminal between a source terminal connected to a communication line and a destination terminal connected to a network, comprising the steps of:

storing at the relay terminal an address list including respective address entries for the destination terminal and other terminals on the network, each of said address entries comprising a destination calling number and a corresponding local number used within said network to identify a same one of the destination terminal and the other terminals;

controlling at the relay terminal a registration and a change of each address entry in the address list;

detecting one of the destination calling numbers corresponding to the destination terminal from the message sent from said source terminal transmitting an image information portion of said message from the source terminal to the destination terminal addressed by the source terminal with the destination calling number;

receiving data from the destination terminal and the other terminals on the network; and transmitting said address list to said source terminal when the source terminal sends the image information message and the apparatus fails to receive an address of the destination terminal so as to inform the source terminal of the address entries of the destination terminal and other terminals.

48. An apparatus configured to communicate with a source terminal connected to the apparatus through a communication line and a destination terminal connected to said apparatus through a network, comprising:

a storage device that holds an address list including respective address entries for the destination terminal and other terminals on the network, each of said address entries comprising a destination calling number and a corresponding local number used within said network to identify a same one of the destination terminal and the other terminals;

a registration controller that controls registration of the address entries in the address list and controls a change of the entries in the address list, a detector that detects when a change is made to the address list;

a communication line interface connected to said communication line;

a network interface connected to said network; and a transmitter configured to transmit said address list to terminals identified on the address list when said detector detects that a change is made to the address list.

49. An apparatus configured to relay information between a source terminal connected to the apparatus through a communication line and a destination terminal connected to said apparatus through a network, comprising:

a storage device that holds an address list including respective address entries for the destination terminal and other terminals on the network, each of said address entries comprising a destination calling number and a corresponding local number used within said network to identify a same one of the destination terminal and the other terminals;

a data input;

a registration controller that controls registration and a change of the entries in the address list;

a first detector that detects a request message sent from said source terminal, said request message being sent during a transmission operational mode and indicative of a request to receive at said source terminal said address list, a second detector that detects the request message and when image information is received from said source terminal, and a third detector that detects one of the destination calling numbers corresponding to the destination terminal from an image information message sent from said source terminal;

a communication line interface connected to said communication line;

a network interface connected to said network; and a transmission controller that controls a transmission of said address list through said communication line interface to said source terminal in accordance with the source facsimile calling number only when said first detector detects said request message.

50. The apparatus of claim 49, wherein said first detector is configured to detect said request message during a polling operational mode.

51. An apparatus according to claim 49, further comprising:

a transmit terminal configured to transmit to the source terminal said address list during an ordinary facsimile operational mode; and wherein said transmission controller instructs said transmit terminal to transmit said address list to said source terminal in accordance with the source terminal calling number detected by said second detector only when said third detector fails to detect a calling number of the destination terminal to which the facsimile terminal sends image information.

52. An apparatus according to claim 51, further comprising:
a verification controller that verifies a source terminal calling number detected by said second detector with a calling number list,
said storage device configured to previously store the calling number list of the source facsimile terminal and other terminals on a public telephone network connected to said communication line, wherein
said transmission controller instructs said transmit terminal to transmit said address list to said source terminal in accordance with the source terminal calling number detected by said second detector only when said third detector fails to detect said one of the destination calling numbers corresponding to the destination terminal to which the source facsimile terminal sends image information and when the source terminal calling number detected by said second detector is verified with said calling number list previously stored in said storage device.

53. An apparatus according to claim 52, wherein said calling number list previously stored in said storage device comprises a list of specific identification numbers based on an agreement between a user of said source terminal and a user of said apparatus.

54. An apparatus according to claim 49, wherein said communication line interface is configured to connect to at least one of a public switched telephone network, an integrated services digital network, and a wireless network.

55. An apparatus according to claim 51, wherein said communication line interface is configured to connect to at least one of a public switched telephone network, an integrated services digital network, and a wireless network.

56. An apparatus according to claim 52, wherein said communication line interface is configured to connect to at least one of a public switched telephone network, an integrated services digital network, and a wireless network.

57. An apparatus according to claim 53, wherein said communication line interface is configured to connect to at least one of a public switched telephone network, an integrated services digital network, and a wireless network.

58. An apparatus according to claim 49, wherein said one of the destination calling numbers corresponding to the destination terminal calling number comprises a sub-address defined by an integrated services digital network.

59. An apparatus according to claim 51, wherein said one of the destination calling numbers corresponding to the destination terminal calling number comprises a sub-address defined by an integrated services digital network.

60. An apparatus according to claim 52, wherein said one of the destination calling numbers corresponding to the destination terminal calling number comprises a sub-address defined by an integrated services digital network.

61. An apparatus according to claim 53, wherein said one of the destination calling numbers corresponding to the destination terminal calling number comprises a sub-address defined by an integrated services digital network.

62. An apparatus according to claim 54, wherein said one of the destination calling numbers corresponding to the destination terminal calling number comprises a sub-address defined by an integrated services digital network.

63. An apparatus according to claim 55, wherein said one of the destination calling numbers corresponding to the destination terminal calling number comprises a sub-address defined by an integrated services digital network.

64. An apparatus according to claim 56, wherein said one of the destination calling numbers corresponding to the destination terminal calling number comprises a sub-address defined by an integrated services digital network.

65. An apparatus according to claim 57, wherein said one of the destination calling numbers corresponding to the destination terminal calling number comprises a sub-address defined by an integrated services digital network.

66. An apparatus according to claim 49, wherein said one of the destination calling numbers corresponding to the destination terminal calling number comprises a direct dial number.

67. An apparatus according to claim 51, wherein said one of the destination calling numbers corresponding to the destination terminal calling number comprises a direct dial number.

68. An apparatus according to claim 52, wherein said one of the destination calling numbers corresponding to the destination terminal calling number comprises a direct dial number.

69. An apparatus according to claim 53, wherein said one of the destination calling numbers corresponding to the destination terminal calling number comprises a direct dial number.

70. An apparatus according to claim 54, wherein said one of the destination calling numbers corresponding to the destination terminal calling number comprises a direct dial number.

71. An apparatus according to claim 55, wherein said one of the destination calling numbers corresponding to the destination terminal calling number comprises a direct dial number.

72. An apparatus according to claim 56, wherein said one of the destination calling numbers corresponding to the destination terminal calling number comprises a direct dial number.

73. An apparatus according to claim 57, wherein said one of the destination calling numbers corresponding to the destination terminal calling number comprises a direct dial number.

74. An apparatus according to claim 49, wherein said one of the destination calling numbers corresponding to the destination terminal calling number comprises characters embedded in a transmitting subscriber identification field defined by a CCITT Group 3 facsimile standard.

75. An apparatus according to claim 51, wherein said one of the destination calling numbers corresponding to the destination terminal calling number comprises characters embedded in a transmitting subscriber identification field defined by a CCITT Group 3 facsimile standard.

76. An apparatus according to claim 52, wherein said one of the destination calling numbers corresponding to the destination terminal calling number comprises characters embedded in a transmitting subscriber identification field defined by a CCITT Group 3 facsimile standard.

77. An apparatus according to claim 53, wherein said one of the destination calling numbers corresponding to the destination terminal calling number comprises characters embedded in a transmitting subscriber identification field defined by a CCITT Group 3 facsimile standard.

78. An apparatus according to claim 54, wherein said one of the destination calling numbers corresponding to the destination terminal calling number comprises characters embedded in a transmitting subscriber identification field defined by a CCITT Group 3 facsimile standard.

79. An apparatus according to claim 55, wherein said one of the destination calling numbers corresponding to the destination terminal calling number comprises characters embedded in a transmitting subscriber identification field defined by a CCITT Group 3 facsimile standard.

80. An apparatus according to claim 56, wherein said one of the destination calling numbers corresponding to the destination terminal calling number comprises characters embedded in a transmitting subscriber identification field defined by a CCITT Group 3 facsimile standard.

81. An apparatus according to claim 57, wherein said one of the destination calling numbers corresponding to the destination terminal calling number comprises characters embedded in a transmitting subscriber identification field defined by a CCITT Group 3 facsimile standard.

82. The apparatus of claim 49, wherein said address list includes a user name field, a facsimile server calling number field, a calling number field and a corresponding local number field for each address entry, so as to specify respective of the destination terminal and the other terminals connected to the network.

83. The apparatus of claim 49, wherein said registration control mechanism is configured to control the registration and the change of the entries by transmitting data from at least one of the destination terminal and other terminals through said communication line interface.

84. The apparatus of claim 49, further comprising:

a transmit terminal configured to transmit image information sent from the source terminal to the destination terminal addressed by the source terminal with the destination calling number and configured to receive data from the destination terminal and the other terminals on the network.

85. The apparatus of claim 84 further comprising:

another transmit terminal configured to transmit said address list during the polling operational mode to the source facsimile terminal.

* * * * *